United States Patent [19]

Alfenaar

[11] 4,237,195
[45] Dec. 2, 1980

[54] POROUS ELECTRODE

[75] Inventor: Marinus Alfenaar, Schinnen, Netherlands

[73] Assignee: Electrochemische Energieconversie N.V., Mol, Belgium

[21] Appl. No.: 917,361

[22] Filed: Jun. 20, 1978

[30] Foreign Application Priority Data

Jun. 24, 1977 [NL] Netherlands .................. 7706998

[51] Int. Cl.³ .................. H01M 4/64; H01M 4/86
[52] U.S. Cl. .................. 429/44; 429/209; 429/241
[58] Field of Search .............. 429/42, 40, 44, 45, 429/209, 233, 241; 427/115, 122, 117, 118

[56] References Cited

U.S. PATENT DOCUMENTS

| | | | |
|---|---|---|---|
| 3,395,049 | 7/1968 | Thompson | 252/428 |
| 3,553,029 | 1/1971 | Kordesch et al. | 429/42 |
| 3,600,230 | 8/1971 | Stachurski et al. | 429/44 X |
| 3,671,317 | 6/1972 | Rifkin | 429/46 X |
| 3,676,222 | 7/1972 | Deibert | 429/42 |
| 3,854,994 | 12/1974 | Binder et al. | 429/40 X |
| 4,091,176 | 5/1978 | Alfenaar | 429/40 |

FOREIGN PATENT DOCUMENTS 1373711 11/1974 United Kingdom .

*Primary Examiner*—Anthony Skapars
*Attorney, Agent, or Firm*—Cushman, Darby & Cushman

[57] ABSTRACT

An improved porous electrode for use in electrochemical cells, particularly for use in fuel cells. The electrode is of the kind comprising a porous layer containing carbon and a non-polar resin such as polytetrafluoroethylene, and an electrically conducting screen acting as a collector. To prevent early collector deterioration the collector material is covered with an electrically conductive protective layer, which consists either of an electrically conductive resin or of a non-conductive resin in which conductive particles, such as graphite particles, have been incorporated.

18 Claims, 2 Drawing Figures

POROUS ELECTRODE

BACKGROUND OF THE INVENTION

1. General Nature of the Invention

This invention relates to porous electrodes for use in electrochemical cells, particularly for use in fuel cells.

2. Description of the Prior Art

A known kind of electrode which is particularly suitable for use in fuel cells comprises a porous layer containing carbon and a non-polar resin and an electrically conducting lattice-work acting as a collector. Such an electrode is described in the published Netherlands patent application No. 72 14900.

During operation the fuel used penetrates into the pores of the porous layer, which usually contains a catalytically active material that catalyses the galvanic combustion of the fuel in the porous layer. The generation of electric current occurs in the porous layer and the current generated is collected by the electrically conducting lattice-work, and led off therefrom. The electorde is in contact with a suitable electrolyte which closes the circuit within the fuel cell and by which the reaction products of reactions occurring at the cathode and anode can also be led off.

A particular disadvantage of known porous fuel-cell electrodes is the detachment of the collector which occurs during operation, e.g. as a consequence of corrosion, which collector consists in practice of, for example, metal gauze with a wire thickness of approximately 150 $\mu$m and a mesh size of approximately 700 $\mu$m, or a correspondingly perforated metal plate. Expanded metal may also be used as a collector. As a result of the corrosion the internal resistance of the electrode increases and the strength of adhesion between the collector and the porous layer decreases. This adhesive strength may decrease even after a relatively short operating time so that the porous layer detaches from the collector and the electrode becomes completely unusable.

To suppress the corrosion, the collector is made of corrosion-resistant metals such as nickel, silver, gold or platinum. Usually nickel is used, as this is the least expensive. Nickel however is not completely free from the disadvantages referred to.

It has previously been suggested in U.S. Pat. No. 3,671,317 to incorporate in an electrode a metal lattice-work which, in order to combat corrosion, is surrounded by an enclosing layer of a thermoplastic material, e.g. polyvinylidene fluoride, with around it, a layer of fluorocarbon polymer, e.g. polytetrafluoro-ethylene, containing conductive particles such as carbon. In such a construction however the metal lattice-work does not act as a collector and this results in a very high internal resistance of the electrode and unfavourable efficiency of current generation.

It has also previously been proposed in French patent specification No. 2,215,710 to affix the collector to the porous layer by means of a synthetic lacquer, e.g. an epoxy resin containing graphite. However, the side of the collector not treated with the lacquer remains exposed to corrosion.

SUMMARY OF THE INVENTION

It is an object of the present invention to provide a porous electrode, e.g. for a fuel cell, in which the collector corrosion is substantially reduced without total or even considerable loss of the collectior effect and in which the flow through the collector meshes or holes remains practically unaffected. The porous electrode of the invention, comprises a porous layer containing carbon and a non-polar resin and an electrically conductive lattice-work acting as a collector, and to prevent early collector deterioration the surface of the collector material is covered with an electrically conductive collector-covering resin layer.

As the non-polar resin in the porous layer suitable resin, particularly synthetic resin, may be used. Various resins for this purpose are known, e.g. polypropylene and more especially polytetrafluoro-ethylene.

The collector-covering layer can derive its electrical conductivity from the resin itself. Electrically conductive resins are well-known. Such a resin is commercially available under the Trade Mark DURA-KOR-ROPREN 44 of the firm Clouth AG.

As such resins are fairly expensive, it may be preferable to use a non-conductive resin in which electrically conductive particles, e.g. of metal, are incorporated. The metal should preferably have a high specific conductivity and be inert under the conditions in which the fuel cell containing the electrode is operated. Examples are platinum, gold, iridium, silver, nickel, or alloys of two or more of these metals. Nickel-chromium steel and similar alloys are also suitable. The electrically conductive particles are however preferably carbon particles, particularly graphite particles. With carbon in the collector-covering layer particularly good adhesion with the porous layer, which also contains carbon, is ensured. Graphite has the advantage over other forms of carbon that it is not significantly attacked during operation of the electrode.

The particles may be substantially spherical in shape, but preferably they will be elongate in form, particularly fibreshaped. The use of particles with an elongate form, particularly in the form of fibres, results in the internal resistance of the electrode being lower than if spherical particles are used. If substantially spherical particles are used, their diameter is preferably from 0.1 to 50 $\mu$m, and particularly from 0.1 to 5 $\mu$m.

The resin in the collector-covering layer may be thermoplastic, thermosetting or rubber-like. Examples of suitable resins are chlorinated rubbers, polyethylene, ethylene vinylacetate copolymer, polypropylene, polyurethane resins, polyvinyl chloride, chlorinated polyethylene, epoxy resins and phenol resins; ethylene-propylene copolymer rubbers, styrene-acrylonitrile copolymer, polybutadiene, butyl rubber or sulphur rubbers can also be used, as also can modified or unmodified polyesters, polyvinyl esters and polyacrylates. The resin preferably has some degree of elasticity.

If an alkaline electrolyte is used in the electrochemical cell, the resin used is preferably an epoxy resin, which has a high resistance to alkali. If an acid electrolyte is used, an epoxy resin can again be used, or alternatively a polyurethane, polyvinyl chloride, a chlorinated rubber or chlorinated polyethylene. It may be desirable to treat the collector metal in advance with an agent to improve the adhsion, e.g. with a primer.

The concentration of conductive particles in the resin can for example be 10-75% by weight of the combination of resin and particles, and is preferably 50-70% by weight.

The thickness of the covering layer will preferably not be greater than is necessary in order to obtain the good adhesion desired between the collector and the porous layer, the reason being to keep the adverse effect on the porosity of the collector as low as possible. A thickness of from 10 to 20 μm is usually adequate, although, if desired, thinner or thicker layers, e.g. from 5 to 50 μm, may be used.

The resin, whether containing conductive particles or not, may be applied to the collector in any sutiable way, e.g. by spraying, moulding or dipping. In a preferred form of production the resin will then be allowed to stiffen or set only partially and then the porous layer will be applied, afther which the stiffening or setting can be completed.

It is of advantage to first make the porous layer and the collector surrounded by the covering layer, and then to press the collector on the electrolyte side at least partly into the layer composition obtained. By this procedure a strong electrode with good porosity properties is obtained. It is also possible to form the porous layer in situ by deposition on the collector surrounded by the covering layer. In another preferred procedure the resin is applied without conductive particles to the collector and then, while the resin is still plastic, the conductive particles are scattered thereon and the collector with its covering layer is pressed at least partly into the previously prepared porous layer, the electrically conductive particles thus being pressed into the still plastic resin in one operation.

The electrodes according to the invention can be made in any suitable way. The catalytically active material can, for example, be mixed in powder form with carbon in powder form and polytetrafluoro-ethylene in powder form and if necessary also a pore-former, followed by moulding of the whole to form an electrode at an elevated temperature, e.g. in a suitable pressing mould, after which the pore-former can be leached, e.g. with hot water. Salts such as sodium sulphate, sodium carbonate, ammonium carbonate and the like can be used as the pore-former.

The catalytic material in powder form may, for fuel-cell electrodes to be used as anodes, be a commercially available platinum black or palladium black or a mixture of the two, or another suitable material such as nickel. For electrodes to be used as cathodes, the catalytically active material is frequently silver powder or a noble metal. The invention is, however, not restricted to specific catalytic mterials, which can in fact be totally absent, or to specific methods of making the porous layer. The porous layer may also consist of a catalytically active material which is dispersed in finely divided form in a porous matrix of carbon and, for example, polytetrafluoro-ethylene. The catalytically active material also may not be in powder form but porously cohesive, e.g. by sintering powder of the particular catalytically active material, usually a metal.

The porosity of the porous layer may be the same over the entire thickness of the porous layer, or may increase or decrease in a direction of thickness. The porous layer may also consist of two or more layers in which the porosity is the same over the entire thickness in each of the constituent layers but the porosity differs from one constituent layer to the other.

It is possible for a porous layer to be provided on only one side of the collector but the collector surrounded by a covering layer may also be provided with a porous layer on both sides.

The invention is applicable both to electrodes which when in use are in contact with a liquid phase on both sides and to gas-diffusion electrodes.

In gas-diffusion electrodes the layer containing the catalyst, which layer is sufficiently porous to pass gas and liquids, will preferably be in contact with a layer which stops liquids but passes gas. During operation the layer which passes both gas and liquids is then in contact with the electrolyte, e.g. a sodium hydroxide or potassium hydroxide solution or a phosphoric acid solution, and the layer which only passes gas is in contact with the gas. For the anode, the gas consists of the gaseous fuel, e.g. hydrogen. For the cathode, the gas consists of oxygen or a gas containing molecular oxygen, e.g. air.

An advantage of the electrode according to the invention lies in the fact that a cheaper metal can be used for the collector material. Instead of nickel or a noble metal it is possible, for example, to use steel or chromium steel without having the electrode rendered unserviceable within a short time.

DETAILED DESCRIPTION OF THE FIGURES

Figure 1:
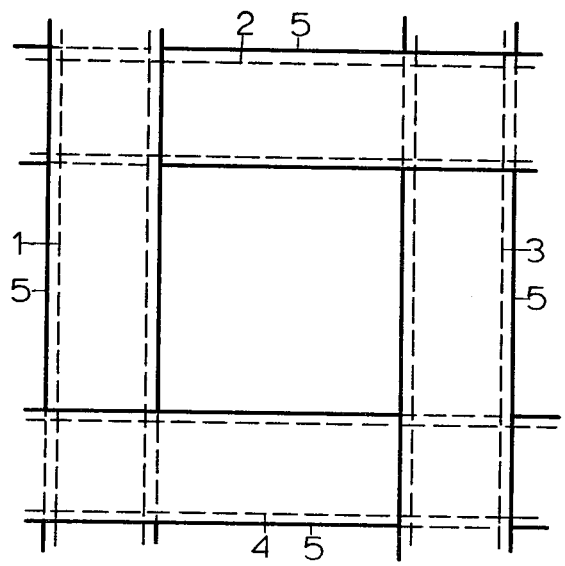
FIG. 1 is a schematic top view of part of an embodiment to the electrode according to the invention and FIG. 2 is a representation of a part section at right angles to the surface of the electrode. Individual numbers always refer to the same parts.
Figure 2:
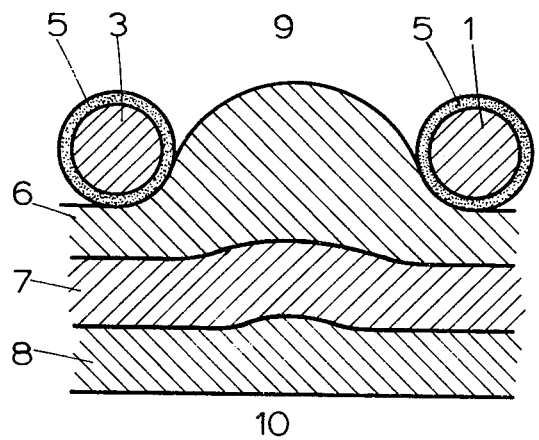

Nickel or steel wires 1, 2, 3 and 4 form part of the collector gauze of the electrode. Instead of wire gauze it is also possible to use a perforated nickel or steel plate, or expanded metal. The collector wires are surrounded by a collector-covering layer. The collector wires provided with the covering layer are embedded in a porous layer made up of constituent layers 6, 7 and 8. When the electrode is in operation the electrolyte phase is at 9. In that case, of course, some electrolyte has penetrated into the pores of the electrode. Furthermore, when the electrode is in operation, the gaseous phase is at 10.

DESCRIPTION OF A PREFERRED EMBODIMENT

In a particular embodiment, the thickness of the wires 1-4 is about 150 μm resulting in a gauze thickness of about 300 μm, the porosity of the collector gauze about 50%.

The term porosity as used here and henceforth is defined as the ratio between the volume occupied by the pores, or the volume not occupied by the particular material, and the total volume of the layer concerned.

The collector-covering layer 5 consists of core varnish obtained under the Trade Mark ELASTOLUX BLANK V2037 of the firm Tollens, (an epoxy resin) containing 50% by weight (of the resin+graphite) of graphite particles. The thickness of layer 5 is 15 μm.

The porous layer of the electrode is made up of constituent layers 6, 7 and 8. Layer 6 consists of a mixture of 90% by weight of carbon and 10% by weight of polytetrafluoro-ethylene. The polytetrafluoro-ethylene content can, however, vary but it should preferably be between 8 and 15% by weight. Layer 6 is approx. 40 μm thick, but of course less in the vicinity of collector wires 1 and 3. Layer 6 may contain catalytically active material but that is not the case in the present example. The porosity of layer 6, apart from the micro pores in the carbon particles, which pores are not of any importance for the working of the electrode, is 30%. It will always preferably be between 25 and 35%. The pore width is 1 to 10 μm. This porosity depends on the particle size of the polytetrafluoro-ethylene powder with which the layer is made and on the pressure used in making the electrode. The same applies to the porosities of layers 7 and 8, hereinafter described.

Layer 7 is 80 μm thick and also consists of a mixture of carbon and polytetrafluoro-ethylene. This layer further contains 0.86 mg/cm$^2$ of silver as catalytically active material. The polytetrafluoro-ethylene content will preferably be between 15 and 30% by weight and in this example is 21% by weight. The porosity is 20% and preferably always between 20 and 25%.

Layer 8 is 180 μm thick on average and consists entirely of polytetrafluoro-ethylene. Its average porosity is 50% and the pore width, as in the case of layers 6 and 7, is between 1 and 10 μm.

EXAMPLE I

An electrode of this kind was used in a continuous 3,000-hour life test as the air electrode in a hydrogen-air fuel cell with a 40% wt. potassium hydroxide solution as the electrolyte. The operating temperature was 65° C., the current density 100 mA/cm$^2$. The increase of the electrode's internal resistance was found by means of regular current/voltage measurements. The rate of increase is a measure for the aging of the electrode due to the reduction of the adhesion between the collector and the porous layer.

The rate of increase of the internal resistance of the electrode was 0.02 ohm.cm$^2$/1,000 hours.

EXAMPLE II

The life test as described in Example I was applied to an electrode identical to that in Example I except that the collector-covering layer consisted of enamel lacquer obtained under the Trade Mark SIKKENS M45-61 of the firm Sikkens (an epoxy-urea resin) containing 50% by weight of graphite particles. The rate of increase of the resistance of the electrode was again about 0.02 ohm.cm$^2$/1,000 hours.

COMPARATIVE EXPERIMENT

The life test as described in Example I was applied to an electrode identical to that the Example I except that the collector-covering layer was omitted. The rate of increase of the internal resistance of the electrode was 0.4 ohm.cm$^2$/1,000 hours.

I claim:

1. A porous electrode comprising a porous layer containing carbon and a non-polar resin and an electrically conductive fluid-permeable screen or grid acting as a collector, wherein the entire surface of the collector material is covered with an electrically conductive collector-covering resin layer.

2. An electrode as claimed in claim 1, wherein the non-polar resin is polytetrafluoro-ethylene.

3. An electrode as claimed in claim 1, wherein the collector-covering layer contains an electrically conductive resin.

4. An electrode as claimed in claim 1, wherein the collector-covering layer consists of a non-electrically conductive resin in which electrically conductive particles have been incorporated.

5. An electrode as claimed in claim 4, wherein the electrically conducting particles are carbon particles.

6. An electrode as claimed in claim 5, wherein the carbon particles are graphite particles.

7. An electrode as claimed in claim 4, wherein the electrically conductive particles are metal particles.

8. An electrode as claimed in claim 4, wherein the diameter of the electrically conductive particles is from 0.1 to 50 μm.

9. An electrode as claimed in claim 8, wherein the diameter of the electrically conductive particles is from 0.1 to 5 μm.

10. An electrode as claimed in claim 4, wherein the electrically conductive particles have the form of fibres.

11. An electrode as claimed in claim 1, wherein the resin in the collector-covering layer is at least to some extent elastic in character.

12. An electrode as claimed in claim 4, wherein the resin in the covering layer is an epoxy resin.

13. An electrode as claimed in claim 4, wherein the resin in the covering layer is a polyurethane, polyvinyl chloride, chlorinated rubber or chlorinated polyethylene.

14. An electrode as claimed in claim 4, wherein the concentration of the electrically conducting particles in the resin is 10–75% by wt. based on the resin plus the electrically conducting particles.

15. An electrode as claimed in claim 14, wherein the concentration of the electrically conductive particles in the resin is 50–70% by wt. based on the resin plus the electrically conductive particles.

16. An electrode as claimed in claim 1, wherein the thickness of the covering layer is from 5 to 50 μm.

17. An electrode as claimed in claim 16, wherein the thickness of the covering layer is from 10 to 20 μm.

18. An electrochemical cell containing one or more electrodes as claimed in claim 1.

* * * * *